No. 751,410. PATENTED FEB. 2, 1904.
H. A. PORTEOUS.
LID OR COVERING FOR FRUIT JARS OR ANALAGOUS VESSELS.
APPLICATION FILED DEC. 10, 1902.
NO MODEL.
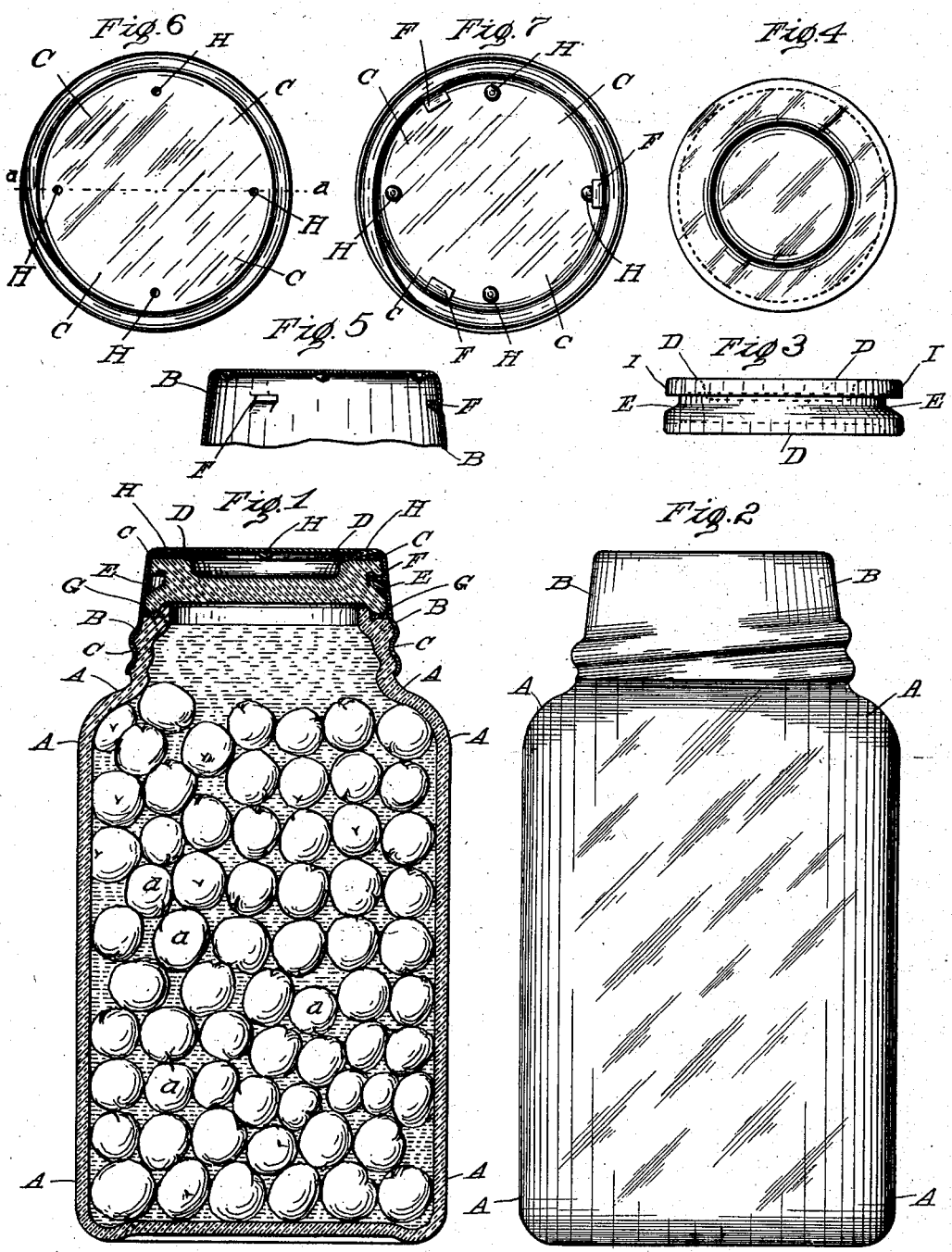

No. 751,410. Patented February 2, 1904.

UNITED STATES PATENT OFFICE.

HUGH ALAXANDER PORTEOUS, OF HEMET, CALIFORNIA.

LID OR COVERING FOR FRUIT-JARS OR ANALOGOUS VESSELS.

SPECIFICATION forming part of Letters Patent No. 751,410, dated February 2, 1904.

Application filed December 10, 1902. Serial No. 134,711. (No model.)

*To all whom it may concern:*

Be it known that I, HUGH ALAXANDER PORTEOUS, a citizen of the United States, residing at Hemet, in the county of Riverside and State of California, have invented a new and Improved Lid or Covering for Fruit-Jars or Analogous Vessels, of which the following is a full, clear, and exact description or specification, reference being had to the annexed drawings and to the letters marked thereon.

This invention, which relates to a new and improved cover to be applied for closing the mouths of jars wherein preserved fruit is placed and which may be used for closing other analogous vessels air-tight, has for its object to so construct the metal part of the cover that while the said metal part of the cover on the one hand completely presses down the interior part thereof (usually made of glass) air-tight upon the ring or packing of elastic material, such as vulcanized india-rubber, which is placed so as when compressed between the edge of the glass part of the cover and the recesses made to contain it in the upper part of the jar, that the joint between the cover and the jar is air-tight. The said metal part of the cover is, on the other hand, also so constructed that in unscrewing it from the mouth of the jar it lifts at one side or position the glass cover out of contact with the india-rubber ring, thereby admitting air into the more or less vacuum in the upper part of the jar, so that my invention consists of a lid which when screwed onto the jar completely closes the same and on being screwed in the reverse direction to open the jar, lifts the glass portion of the cover which presses on the rubber ring, thereby dispensing with the use of a knife or other instrument operated by leverage, as at present, for separating a glass cover from the elastic ring and mouth of the jar.

Upon the annexed drawings, Figure 1 is a vertical section of the fruit-jar, showing my improved covering applied thereto. Fig. 2 is an elevation of the same. Fig. 3 is an elevation of the glass portion of the cover or lid. Fig. 4 is a top plan of the same glass cover or lid. Fig. 5 is a vertical section of the upper part of the metallic casing of the cover, the lower screw portion thereof being broken away; said screw portion, however, being seen in section in Fig. 1, in elevation in Fig. 2, and in top and inverted plans, respectively, in Figs. 5 and 6. Fig. 6 is a top plan of Fig. 5, showing the indentations causing the depressions in the upper metal portion of the lid, which press upon the glass part thereof. Fig. 7 is an inverted plan of the lid, showing certain projections, hereinafter described.

In Figs. 1 and 2 the fruit jar or receptacle is marked A A, the same being formed with a coarse screw-thread at the top marked B, upon which the screw-thread in the lower part of the metallic portion of the cover C fastens, as shown at Fig. 1. The glass part D of the cover is formed with a groove E, as shown at Figs. 1 and 3 more especially. Three projections F, as shown at Figs. 1, 5, and 7, are pressed in the metal of the lid B after the glass portion D is placed within the lid B. By these metal projections F the metallic cover C and the glass portion D of the lid are held together, so that the metallic cover C can be turned round and round upon the glass portion D of the cover. By means of this construction of the cover in two portions, C and D, movable rotatively in relation to each other, facility is afforded so soon as the screw portion C, on being screwed sufficiently far down upon the screw portion of the jar A, brings the glass portion D into contact with the elastic packing-ring G, and further screwing down of the metallic portion C of the lid causes the projections H H H to press hard upon the upper flat part of the glass portion D of the cover until the ring G is pressed sufficiently to render the joint altogether air-tight.

One of the projections F in the periphery of the metallic portion C of the cover is situated at a higher level (say about one-sixteenth of an inch) above the other projections F, by reason of which arrangement on unscrewing the metallic part of the cover C for the purpose of opening the fruit-jar or other receptacle that one of the projections F which is highest comes first in contact with the upper more or less flat surface I of the glass portion D, and as the unscrewing of the cover C is continued the pressure of this highest projection F begins to lift the glass portion D out of contact with the elastic ring G, thereby gradually admitting air into the upper part of the fruit-jar or other vessel, so that the opening of the jar or other vessel is easily effected by continuing the unscrewing of the metallic portion C of the lid.

In Fig. 1 cherries or other fruit $a\ a\ a$, &c., and syrup are shown contained within the jar A.

I desire to be understood that by preference I make the upper part of the groove E in the form shown more especially in section at Fig. 1 and in dotted lines at Fig. 3—that is to say, that a recess at the upper inner part therein—the object of this being to cause the projections F from the inner part of the cover to bear upon the glass portion of the lid as much as possible near the edge thereof.

Having now described the nature of my said invention and the best system, mode, or manner I am at present acquainted with for carrying the same into practical effect, I desire to observe in conclusion that what I consider to be novel and original, and therefore pray as the invention to be secured to me by Letters Patent, is as follows:

1. A lid or cover for fruit-jars and analogous vessels consisting of a metal cover having both lateral and downward projections at the interior thereof, the lower part of said cover being constructed with a coarse screw-thread, said cover containing a rotatable lid of glass or analogous material having an annular groove with which the lateral projections from the interior of the metallic cover engage, and upon the upper part of which the downward projections of the top of the metallic cover press as the lid is tightened on the jar or analogous vessel, one of the lateral projections being on a higher level than the other lateral projection, the whole operating together in the manner and for the purposes substantially as set forth.

2. The combination consisting of a fruit-jar or analogous vessel, a screw portion constituting the upper part of said jar or vessel, an elastic ring, the cover, a glass part of the cover resting on said elastic ring, the glass portion of the lid or cover being formed with an annular groove, the metallic lid with screw-thread at bottom, and two or more projections, one of which is constituted on a higher level than the other projection or projections, and projections in the top of the metallic portion bearing upon the upper part of the glass portion of the cover or lid, all operating together in the manner and for the purposes substantially as set forth.

In witness whereof I, the said HUGH ALAXANDER PORTEOUS, have hereunto set my hand this 5th day of November, 1902.

HUGH ALAXANDER PORTEOUS.

Witnesses:
 ST. JOHN DAY,
 OWEN G. CATES.